(12) United States Patent
Warren

(10) Patent No.: US 6,463,731 B1
(45) Date of Patent: Oct. 15, 2002

(54) TWO STROKE REGENERATIVE EXTERNAL COMBUSTION ENGINE

(76) Inventor: Edward Lawrence Warren, 3912 Snowy Egret Dr., West Melbourne, FL (US) 32904

( * ) Notice: Subject to any disclaimer, the term of this patent is extended or adjusted under 35 U.S.C. 154(b) by 0 days.

(21) Appl. No.: 09/949,540

(22) Filed: Sep. 10, 2001

(51) Int. Cl.$^7$ .................................................. F02C 5/00
(52) U.S. Cl. .............................. 60/39.6; 60/512; 60/515
(58) Field of Search ........................ 60/39.6, 508, 512, 60/515, 526

(56) References Cited

U.S. PATENT DOCUMENTS 4,074,533 A * 2/1978 Stockton ...................... 60/620
4,077,221 A * 3/1978 Maeda ......................... 60/650
4,511,805 A * 4/1985 Boy-Marcotte et al. ........ 290/2

* cited by examiner

Primary Examiner—Hoang Nguyen

(57) ABSTRACT

This invention is a two stroke, regenerated, external combustion, reciprocating engine. Each unit of the engine has cylinder 12 that is closed at one end by cylinder head 4 and contains power piston 18 that is connected to power output shaft 22, and plunger 11 that sucks in fluid and pushes out exhaust. Plunger 11 is a movable wall which has attached to it plunger valve 8 that opens to allow fluid to flow through plunger 11 while plunger 11 is moving away from piston 18, and closes to form a plunger while plunger 11 is moving towards piston 18. Plunger 11 also has attached to it exhaust pipe 7, exhaust valve 6, heater 14, and an alternating flow heat exchanger, called regenerator 10. Means are provided for the introduction of heat into cylinder 12.

13 Claims, 5 Drawing Sheets

TWO STROKE REGENERATIVE EXTERNAL COMBUSTION ENGINE

BACKGROUND—FIELD OF INVENTION

The present invention relates to thermally regenerated, reciprocating, two stroke external combustion engines that store the exhaust heat and return it to the engine cycle to do work.

BACKGROUND—DESCRIPTION OF PRIOR ART

Thermal regeneration is the capturing of waste heat from a thermodynamic cycle (or a heat engine operating on some thermodynamic cycle), and the utilization of that energy within the cycle or engine to improve the cycle or engine's performance. This is commonly done with many heat engines including Stirling engines, gas turbines, and Rankine cycle devices. In a gas turbine the exhaust heat coming out of the exhaust is transferred to the fluid leaving the compressor and going into the combustor. This way it is not necessary to add as much heat (fuel) in the combustor to raise the fluid temperature to the desired turbine inlet temperature. This means that the same work is accomplished but less fuel is used. The approach taken by most inventors who attempted to incorporate regeneration into reciprocating external combustion engines was to try to regenerate existing designs. The three most successful designs are: the four cycle Otto cycle, the two stroke gasoline engine, and the so called twin cylinder engines where the air is compressed in one chamber, combusted in another, and expanded in a third. With the exception of Clark (1996, U.S. Pat. No. 5,540,191) all of the existing designs are four cycle designs with adaptation to two stroke engines such as Wakeman (1981, U.S. Pat. No. 4,284,055); Ferrenberg and Webber (1988, U.S. Pat. No. 4,790,284) and (1990, U.S. Pat. No. 4,928,658); and Ferrenberg (1995, U.S. Pat. No. 5,465,702) and (1997, U.S. Pat. No. 5,632,255). The major drawback to all of the above two stroke designs is that they improve existing designs (crankcase compression or the use of external compression) instead of using the regenerator to aid in the intake and exhausting of air and products of combustion. With crankcase compression engines, no scavenging of the cylinder is possible, the volumetric efficiency is low (30 to 50 percent), and the engine is limited to operation at low piston speed (usually less than 1,000 fpm) for economical operation. Other differences exist between the engines and the regenerated engine disclosed herein. All of these are discussed in greater detail in the section entitled "Detailed Description of the Invention".

SUMMARY

This invention is a two stroke, regenerated, external combustion, reciprocating engine made up of a number of similar working units. Each working unit is comprised of a cylinder that is closed at one end by a cylinder head and contains a movable power piston that is connected to a power output shaft. Means are provided (a plunger) to suck in the fluid and push the exhaust out of the cylinder. This plunger can move between the power piston and the cylinder head, and means are provided to accomplish this movement at the appropriate times during the engine's operating cycle. The plunger is a movable wall that has attached to it a plunger valve which opens to allow fluid to flow through the movable wall while the plunger is moving away from the piston, and closes to form a suction plunger while the plunger is moving towards the piston. The plunger also has attached to it an exhaust pipe, an exhaust valve that opens while the plunger is moving towards the power piston, a heater, and an alternating flow heat exchanger, called a regenerator. The movement of the plunger with its regenerator is such that the regenerative exhaust cooling stroke (the regenerator is heating) begins when the power piston is at about 85% of the way from the cylinder head, and ends when the power piston is about 15% of the way towards the cylinder head. The compressed fluid heating stroke (the regenerator is giving up heat) begins at about 85% of the power piston's stroke towards the cylinder head, and ends at about 15% of downward travel of the power piston's expansion stroke. Means are provided for the introduction of heat into the cylinder. The engine can be operated with almost complete expansion of the charge.

OBJECTS AND ADVANTAGES Several objects and advantages of the regenerative engine are:

(a) The engine compresses the fluid in the same cylinder that the engine expands the fluid in.
(b) The engine compresses the fluid in a portion of the cylinder that is not heated by the hot gases.
(c) The engine saves the heat from the exhaust gases and releases the heat to the compressed fluid.
(d) All of the engines valves operate at compressor exit temperature or slightly higher.
(e) The engine exhausts most of the exhaust gases each stroke.
(f) The engine can be operated so that the charge is almost fully expanded.

DRAWING FIGURES

FIG. 1 depicts the engine at the start of the intake, exhaust, and regenerative cooling cycle.

FIG. 2 shows the engine at the start of the compression cycle

FIG. 3 shows the engine at the start of the heating cycle.

FIG. 4 shows the engine at the start of the expansion part of the cycle.

Figure 1:
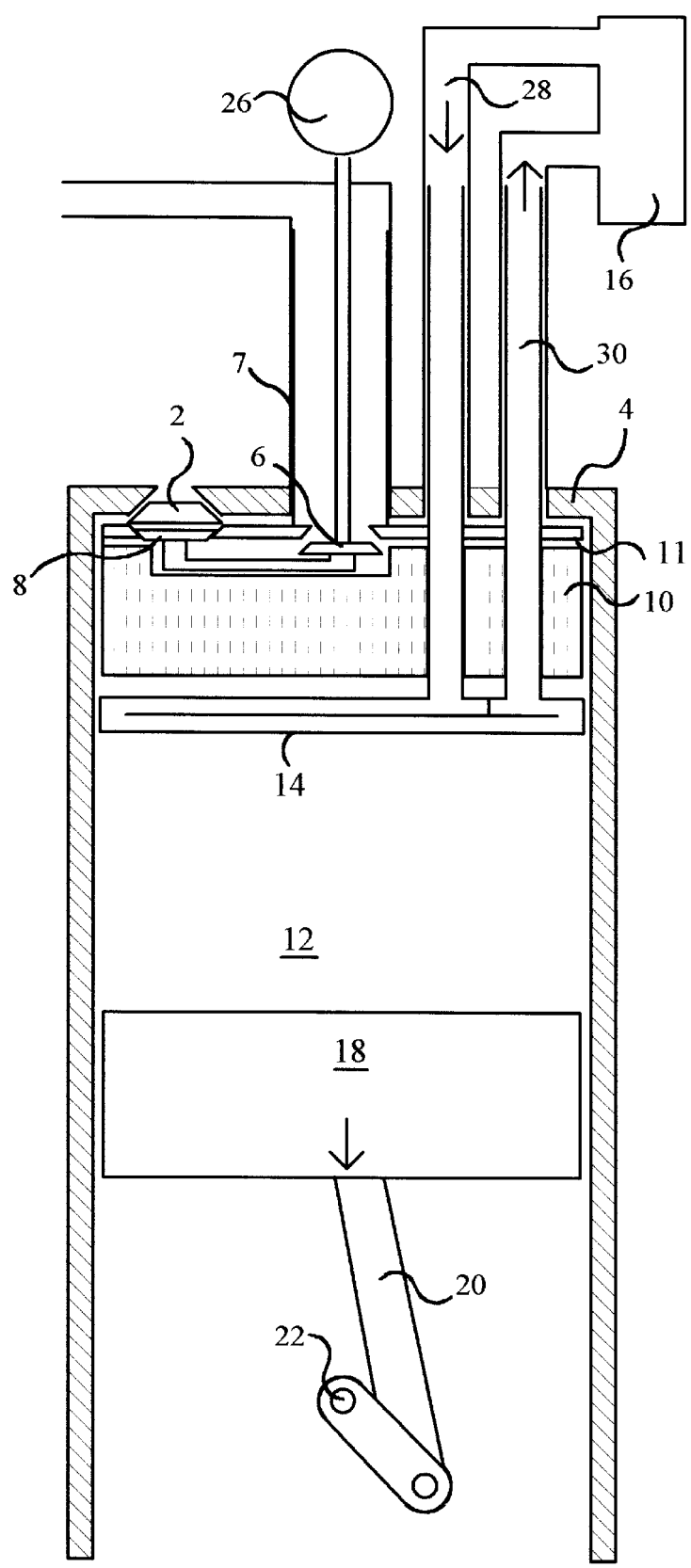
FIGS. 1–4 are schematic illustrations of the preferred embodiment of a two stroke regenerative engine.

REFERENCE NUMERALS IN DRAWINGS 2 fluid inlet valve
4 cylinder head
6 exhaust valve
7 exhaust pipe
8 plunger valve
10 regenerator
11 plunger
12 cylinder
14 heater
16 heat source
18 power piston
20 connecting rod
22 power output shaft
24 cooler
26 cam
28 heater fluid supply pipe
30 heater fluid exit pipe

DESCRIPTION—FIGS 1 to 4—Preferred Embodiment

This invention is a two stroke regenerative, reciprocating, external combustion engine employing a plunger 11 housing a regenerator 10 as described herein. The preferred embodiment of this invention employs two-strokes divided into four cycles. The first cycle is the intake, exhaust, and regenerative cooling cycle. The second is the compression cycle, the third is the heating cycle, and the fourth is the expansion cycle. The intake, exhaust, and regenerative cooling cycle is from about 85% of the downward travel of power piston 18 to about 15% of the travel back up. The compression cycle is from about 15% of the travel back up of power piston 18 to about 85% of the upward travel of power piston 18. The heating cycle is from about 85% of the upward travel of power piston 18 to about 15% of the downward travel of power piston 18. The expansion cycle is from about top dead center to about 85% of the downward travel of power piston 18. The above positions are all estimates and are given for descriptive purposes only. The actual position, at which a part of the cycle may begin or end, may be different from those set out above. (Note that the compression cycle and the heating cycle do not have to overlap. The exhaust pipe can be sized such that no mechanical compression takes place during regenerative heating. The heating and expansion cycles do overlap.)

The intake, exhaust, and regenerative cooling cycle begins with plunger 11 adjacent to the cylinder head 4 and ends with the plunger 11 adjacent to power piston 18. During the intake, exhaust, and regenerative cooling cycle, plunger 11 moves down (towards power piston 18) forcing the hot exhaust gases through regenerator 10, and regenerator 10 absorbs heat from heater 14 and the exhaust gases (cooling the exhaust gases). As plunger 11 is making the intake, exhaust, and regenerative cooling cycle it is forcing out exhaust gases and sucking in fresh fluid.

The compression cycle starts with plunger 11 close to and moving up with power piston 18 and ends with the plunger 11 moving away from power piston 18. The regenerative heating stroke starts with plunger 11 moving away from power piston 18 and ends with the plunger 11 adjacent to cylinder head 4. During the heating stroke regenerator 10 and heater 14 are moved up through the fluid trapped between power piston 18 and cylinder head 4 and transfers heat to this fluid (heating the fluid). The fluid that is expected to be employed in this invention is air. However, this fluid could be any mixture of gases and liquids. The fluid that is introduced into the cylinder is sometimes referred to as fresh fluid, or as the charge. After expansion the fluid is referred to as spent fluid, exhaust fluid, or exhaust gases. When plunger 11 is not moving, it is adjacent to cylinder head 4. "adjacent to" means that plunger 11 is in contact with or as close as possible to cylinder head 4 given the mechanical and structural constraints associated with the coming together of rapidly moving objects. "Close to" is synonymous with "adjacent to". While it is advantageous to minimize some external volumes that are not swept by plunger 11, it must be recognized that small clearance regions or volumes will probably be necessary to prevent damaging impacts between components and for clearances between moving components. Examples of such clearance regions or volumes include small gaps between plunger 11 and cylinder head 4 when plunger 11 is adjacent to it, the clearance gap between the periphery of plunger 11 and cylinder 12 wall, and other non-heated or partially heated volumes. There is external volume between power piston 18 and plunger 11 as the two come together.

FIGS. 1–4 Illustrate schematically an external combustion engine suitable for practice of this invention. Only one set of components for such an engine is illustrated; however, what is illustrated will function as a complete engine if it has an inertial load. It will be understood that this is merely representative of one set of components. A plurality of such structures joined together would make up a larger engine. Other portions of the engine are conventional. Thus, the bearings, seals, etc. of the engine are not specifically illustrated. The valves illustrated are but one type out of many that could be used.

Cylinder 12 is closed at one end by a cylinder head 4 that contains fluid inlet valve 2. When fluid inlet valve 2 is open it allows fluid to be sucked into the cylinder volume located between cylinder head 4 and plunger 11. Cylinder 12 further contains power piston 18 which is connected to power output shaft 22 by a connecting rod 20 (for converting the linear motion of the piston to the rotating motion of the shaft).

Fluid inlet valve 2 allows fluid to enter the engine. It can be any of a variety of valves including those referred to as check valves or one way valves. The expanding gases exert a force on power piston 18, (a cylindrical piston that can move up and down in cylinder 12). That force, exerted on power piston 18 moving it down, is transmitted via connecting rod 20 and power output shaft 22 to a load (not shown). Cylindrically shaped plunger 11 houses cylindrically shaped regenerator 10, exhaust valve 6, plunger valve 8, exhaust pipe 7 and heater 14.

Heater fluid supply pipe 28 transfers hot fluid to heater 14 from heat source 16, and heater fluid exit pipe 30 transfers spent fluid from heater 14 back to heat source 16. Exhaust valve 6 allows the exhaust gases to leave the engine. Exhaust pipe 7 ducts the exhaust gases away from the engine. Heater fluid supply pipe 28, heater fluid exit pipe 30, and exhaust pipe 7 have sections that slide by one another like sections of a small telescope.

Plunger 11 is a movable wall with exhaust pipe 7 attached to it. Plunger 11 has a one way valve, plunger valve 8, to allow flow through it in one direction only. Plunger 11 moves between the power piston and cylinder head 4. There are many ways to move plunger 11, but for ease of explanation, plunger piston 11 and exhaust valve 6 will be assumed to be moved by cam 26 driven from power output shaft 22.

Plunger 11 moves up and down in cylinder 12, and it displaces fluid from the space that it moves into. When plunger 11 moves up plunger valve 8 opens and allows fluid to move from the space between regenerator 10 and cylinder head 4 into the space below plunger 11 and above power piston 18. When plunger 11 is moving down, plunger valve 8 closes and does not allow any fluid to pass. Regenerator 10 is made from a permeable material such that when regenerator 10 moves down and the exhaust gases flow through it, the material absorbs heat from the exhaust gases. When regenerator 10 moves up, the permeable material gives up heat to the compressed fluid. Cam 26 opens and closes exhaust valve 6 and plunger valve 8. Cam 26 also causes plunger 11 to move. Attached to plunger 11 is regenerator 10, heater 14, exhaust pipe 7 (when exhaust valve 6 is open, exhaust pipe 7 conducts the exhaust gases that flow through regenerator 10 to an exhaust manifold not shown), plunger 11 moves back and forth (down and up) between cylinder head 4 and power piston 18 parallel to the axis of the cylinder.

The means to move plunger 11 is cam 26, the angular displacement between cam 26 and power output shaft 22 is approximate and must be determined for the detail design of the engine. Other means can be used to move exhaust valve 6, such as a push rod, and a rocker arm (not shown). These other means can be applied from above or below power piston 18. The means can be hydraulic, pneumatic, electrical, mechanical, or any combination of them that will move the exhaust valve 6 as required.

Figure 5:
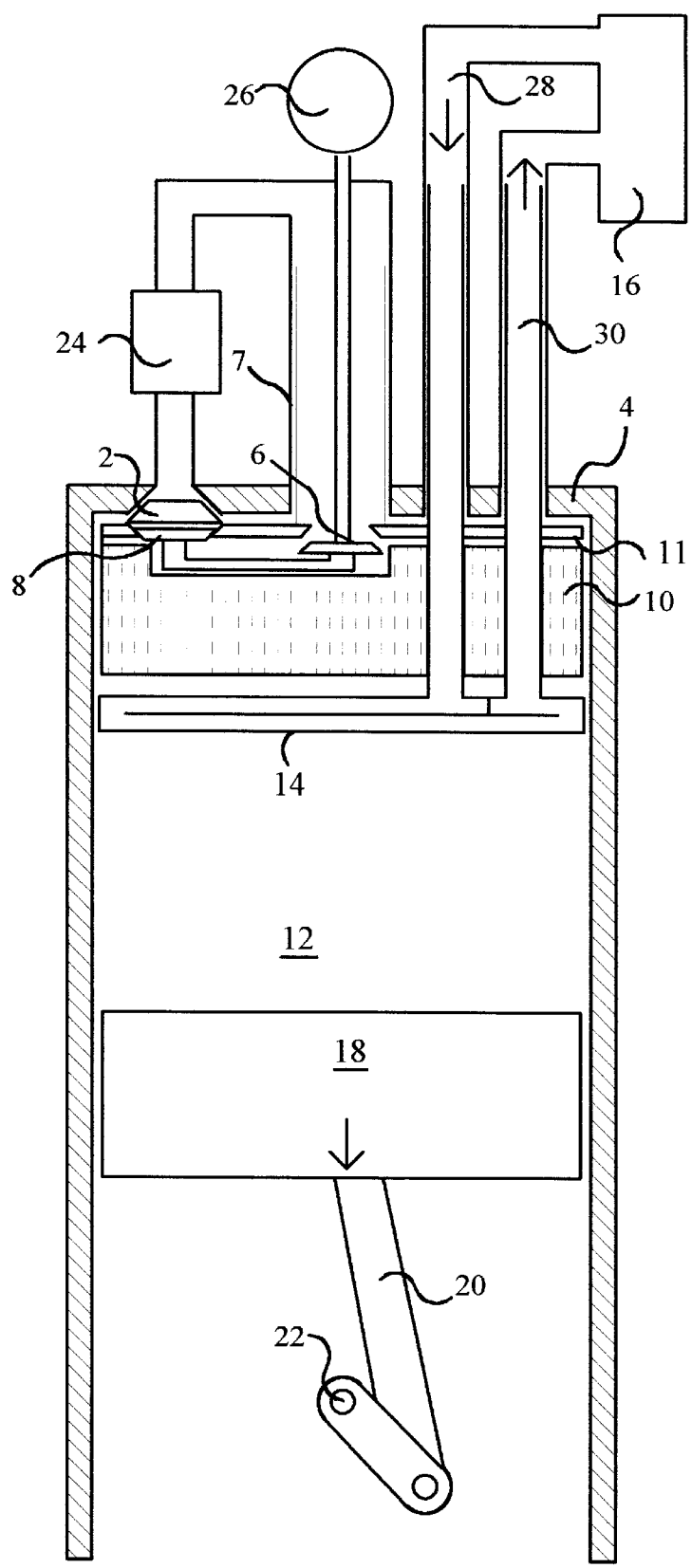
FIG. 5 depicts the engine operating in a closed cycle at the start of the intake, exhaust, and regenerative cooling cycle.

FIG. 5—First Alternate Embodiment

A first alternate embodiment of the engine is shown in FIG. 5. It is the engine of FIGS. 1–4 with the exhaust fluid routed from exhaust pipe 7 through cooler 24 and returned to fluid inlet valve 2.

FIGS. 1 to 4—Operation of Preferred Embodiment

Figure 2:
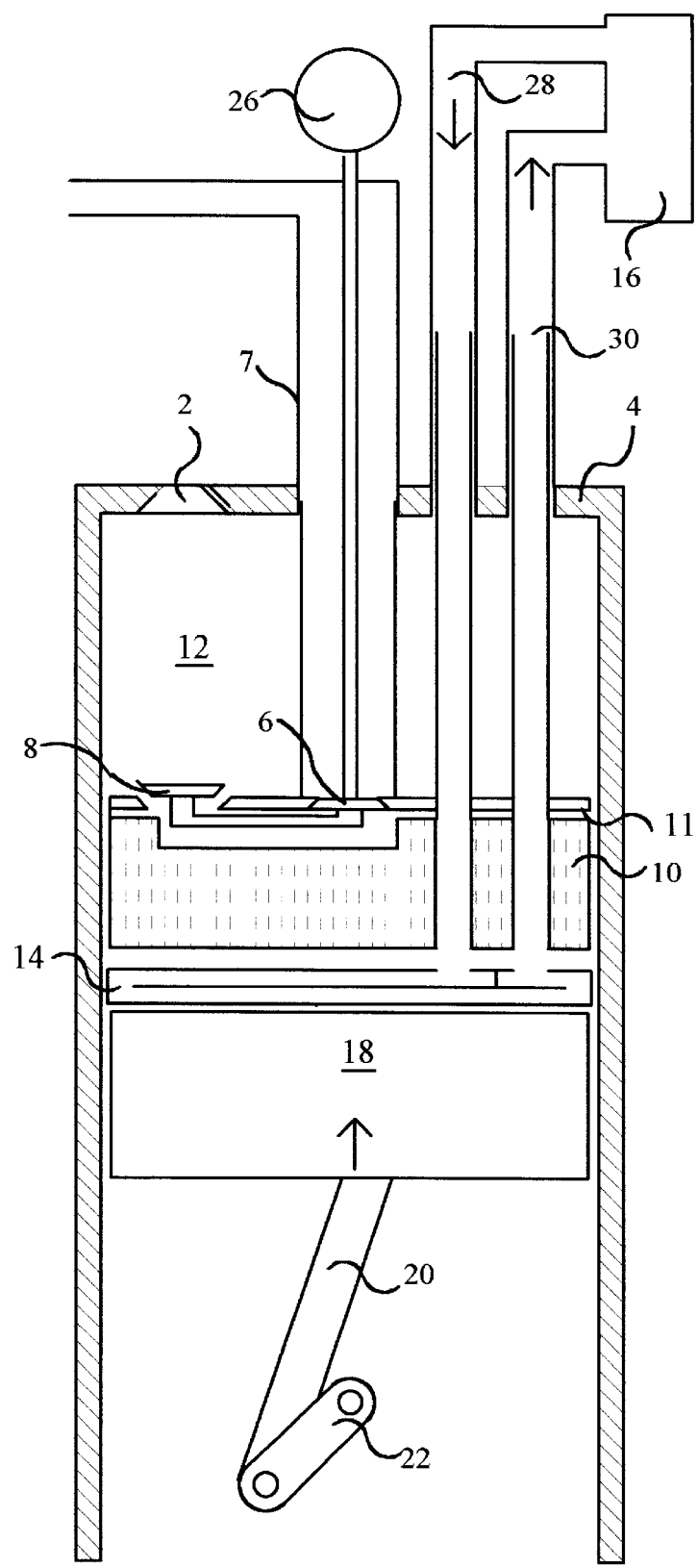
Figure 3:
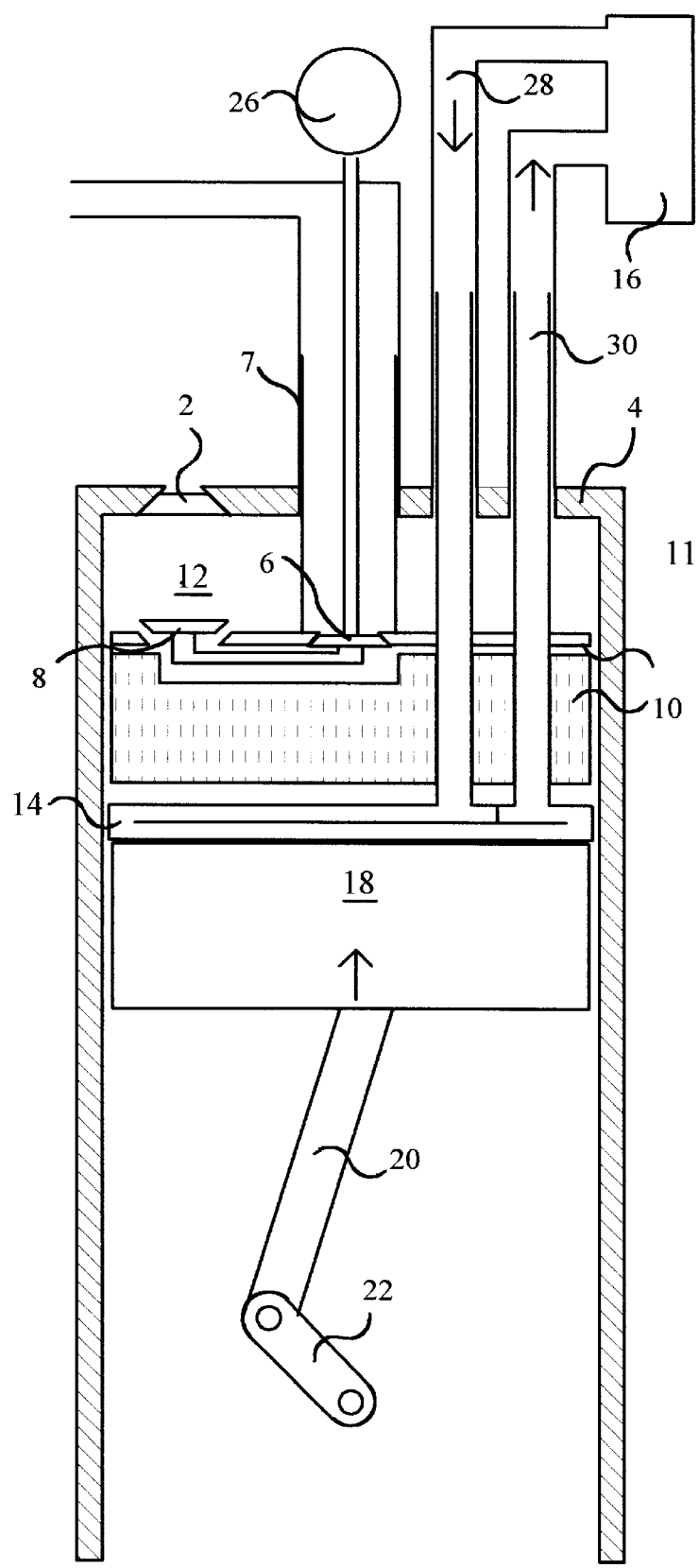
Figure 4:
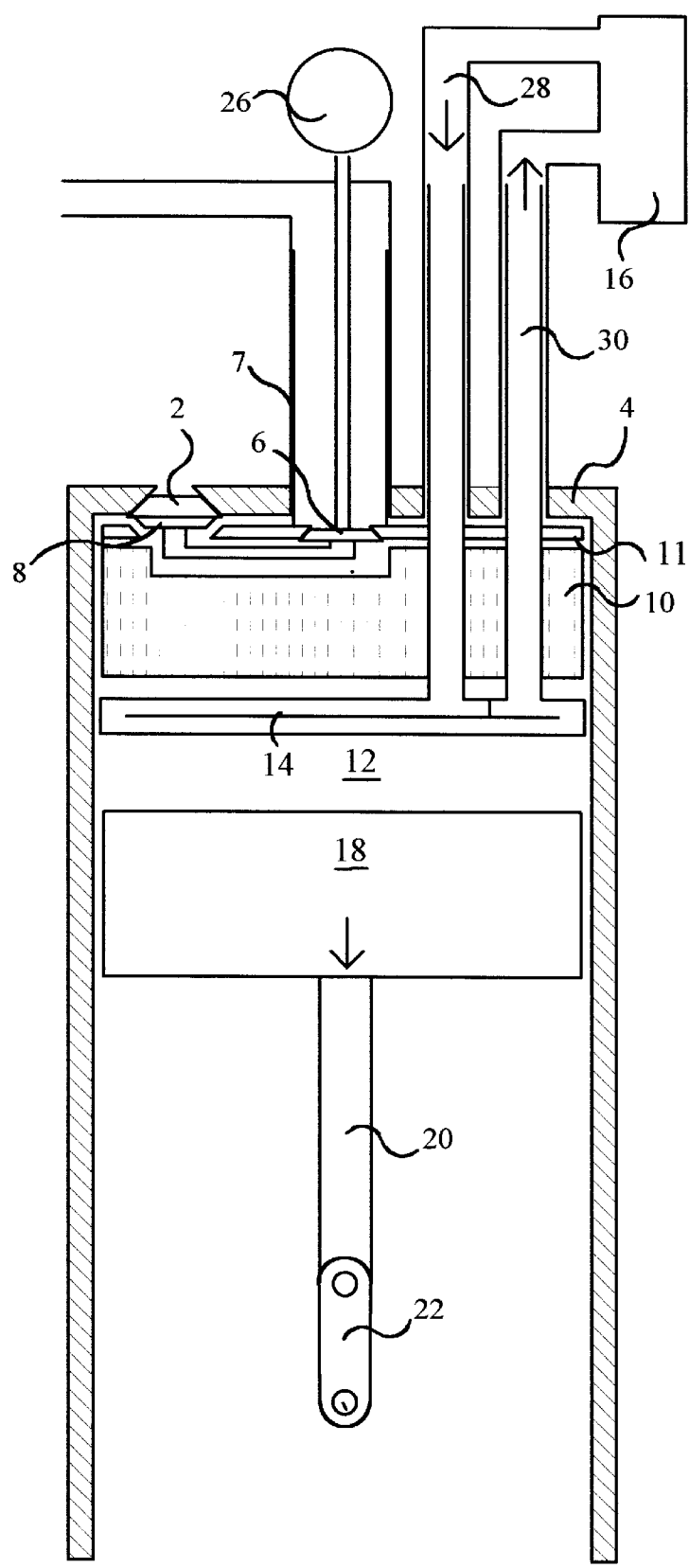

The engine operates as follows:

Fluid comes from heat source 16, goes to heater 14, and returns to heat source 16 all the time the engine is operating.
Between FIG. 4 and FIG. 1
Power piston 18 is moving down as a result of pressure created by the fluid heating.
In FIG. 1
At about 85% of downward travel of power piston 18, the cam 26 opens exhaust valve 6.
Exhaust valve 6 has closed plunger valve 8.
Plunger 11 starts to move down because it is urged along by cam 26 using open exhaust valve 6.
Fluid inlet valve 2 has just opened from pressure forces.
Between FIG. 1 and FIG. 2
Plunger 11 continues to move down sucking in fresh fluid and pushing out exhaust gases.
The exhaust gases going out heat up regenerator 10.
Power piston 18 starts back up.
In FIG. 2
Power piston 18 and plunger piston 11 come close to one another.
Cam 26 closes exhaust valve 6.
Exhaust valve 6 has opened plunger valve 8.
Pressure forces have closed fluid inlet valve 2.
Between FIG. 2 and FIG. 3
Power piston 18 moving upwards compresses the fluid.
Power piston 18 and plunger 11 move up together
In FIG. 3
Power piston 18 and plunger 11 are at about 85% of the upward travel of power piston 18.
Between FIG. 3 and FIG. 4
Cam 26 and/or compressed fluid pressure acting on exhaust valve 6 forces plunger 11 away from power piston 18 and up against cylinder head 4.
As plunger 11 moves up toward cylinder head 4, the compressed fluid moves through heater 14 and regenerator 10 and heats up.
Between FIG. 4 and FIG. 1
The expanding fluid acting on power piston 18 delivers power output.
When power piston 18 reaches about 85% of its downward travel the cycle repeats.

FIG. 5—Operation of the First Alternate Embodiment

The engine operates as follows:

Fluid comes from heat source 16, goes to heater 14, and returns to heat source 16 all the time the engine is operating.
Power piston 18 moves down as a result of pressure created by the fluid heating.
At about 85% of downward travel of power piston 18, the cam 26 opens exhaust valve 6.
Exhaust valve 6 closes plunger valve 8.
Plunger 11 moves down because it is urged along by cam 26 using open exhaust valve 6.
Fluid inlet valve 2 opens from pressure forces.
As plunger 11 moves down exhaust gases are pushed out and go through cooler 24 were they are cooled, then they are sucked back through fluid inlet valve 2.
The exhaust gases going out heat up regenerator 10.
Power piston 18 starts back up.
Power piston 18 and plunger piston 11 come close to one another.
Cam 26 closes exhaust valve 6.
Exhaust valve 6 opens plunger valve 8.
Pressure forces close fluid inlet valve 2.
Power piston 18 moving upwards compresses the fluid.
Power piston 18 and plunger 11 move up together until they are at about 85% of the upward travel of power piston 18.
Cam 26 and/or compressed fluid pressure acting on exhaust valve 6 forces plunger 11 away from power piston 18 and up against cylinder head 4.
As plunger 11 moves up toward cylinder head 4, the compressed fluid moves through regenerator 10 and heater 14 and heats up.
The expanding fluid acting on power piston 18 delivers power output.
When power piston 18 reaches about 85% of its downward travel the cycle repeats.

Important Features

The volume of the intake fluid and the clearance volume can be adjusted so that when plunger 11 moves away from power piston 18 no mechanical compression takes place. That is no mechanical compression takes place while regenerator 10 and heater 14 are heating the compressed fluid.

The first alternate embodiment of the invention can be operated at minimum cycle pressures greater than atmospheric.

CONCLUSION

Accordingly, the reader will see that the Two Stroke Regenerative External Combustion Engine meets the following objects and advantages:
(a) The engine compresses the air in cylinder 12, and the engine expands the charge in cylinder 12.
(b) The engine compresses most of the air in a portion of the cylinder above plunger 11 that is not heated by the hot gases.
(c) Movable regenerator 10 saves the heat from the exhaust gases and releases the heat to the compressed air.
(d) All of the engine valves operate at compressed fluid temperature or slightly higher.
(e) Plunger 11 pushes out most of the exhaust gases each stroke.
(f) The engine will operate so that the charge is almost fully expanded.

Although the description above contains much specificity, these should not be construed as limiting the scope of the invention but as merely providing illustrations of some of the presently preferred embodiments of this invention.

Thus the scope of the invention should be determined by the appended claims and their legal equivalents, rather than by the examples given.

I claim:
1. A two stroke, external combustion, reciprocating engine having a number of similar working units, each working unit comprising:
   a) a cylinder, closed at one end by a cylinder head and containing a movable power piston which moves in a reciprocating manner and is connected to a power output shaft;

b) a plunger located within said cylinder and between said power piston and said cylinder head, said plunger can be moved between said power piston and said cylinder head;

c) one way flow means located on said plunger to prevent flow through said plunger when said plunger moves towards said power piston, and allow flow through said plunger when said plunger moves towards said cylinder head;

d) exhaust means located on said plunger to permit the flow of exhaust fluid from said cylinder when said plunger moves towards said power piston, and prevent the flow of exhaust fluid from said cylinder at all other times;

e) intake means for permitting the flow of fresh fluid into said cylinder;

f) an actuator means for both operating said exhaust means and moving said plunger during predetermined times during the engine's operating cycle;

g) a thermal regenerator, located on said plunger, said regenerator being an alternating flow heat exchanger which moves with said plunger between said cylinder head and said power piston, and stores heat from exhaust fluid as it moves towards said power piston, and releases heat to the compressed charge as said regenerator moves away from said power piston;

h) a heat input means is located on said plunger so that it is between said regenerator and said power piston.

2. An engine as recited in claim 1 wherein said heat input means is supplied hot fluid from a solar collector.

3. An engine as recited in claim 1 wherein said heat input means is supplied hot fluid from a nuclear reactor.

4. An engine as recited in claim 1 wherein said heat input means is supplied hot fluid from the exhaust of another engine.

5. An engine as recited in claim 1 wherein said heat input means is supplied hot fluid from an external source.

6. An engine as recited in claim 1 wherein said actuator means is a cam.

7. An engine as recited in claim 1 wherein said actuator means allows said plunger to remain at the top of said cylinder until expansion is almost complete.

8. An engine as recited in claim 1 wherein said actuator means also opens and closes said one way flow means located on said plunger.

9. An engine as recited in claim 1 wherein said one way flow means is actuated by pressure difference from the top side of said plunger to the bottom side of said plunger.

10. A process for operating the engine of claim 1 having the following steps:

a) Said heat input means receives heat from an external source all the time the engine is operating;

b) when said power piston is near the end of its expansion stroke, said actuator means opens said exhaust means, and starts the downward movement of said plunger, said one way flow means closes, exhaust fluid is expelled from said cylinder, on the way out said exhaust fluid cools as it heats up said regenerator, and in the same stroke said intake means opens and fresh fluid is introduced into said cylinder;

c) said power piston moves through its bottom dead center position and starts back up, while said plunger continues its downward exhaust and intake stroke;

d) said plunger reverses to an upward movement, said one way flow means opens, said exhaust means closes, said intake means closes, thereby ending said exhaust and intake cycle;

e) said power piston and said plunger move up toward said cylinder head, thereby performing a compression stroke whereby said fluid trapped in said cylinder is compressed;

f) at about 85% of the upward movement of said power piston, said plunger moves away from its position adjacent to said power piston and moves toward said cylinder head;

g) as said plunger moves up, said compressed fluid moves through said heater and said regenerator and heats said fluid;

h) the space between said moving plunger and said power piston continues to be heated as said power piston moves away from said cylinder head in said power piston's expansion stroke;

i) after said plunger moves to the top of said cylinder adjacent to said cylinder head it remains there while said power piston continues its expansion stroke;

j) the cycle repeats.

11. An engine as recited in claim 1 that contains an exhaust fluid cooler.

12. A process for operating the engine of claim 11 having the following steps:

a) Said heat input means receives heat from an external source all the time the engine is operating b) when said power piston is near the end of its expansion stroke, said actuator means opens said exhaust means, and starts the downward movement of said plunger, said one way flow means closes, exhaust fluid is expelled from said cylinder, on the way out said exhaust fluid cools as it heats up said regenerator, said exhaust fluid is further cooled in said exhaust fluid cooler, and in the same stroke said intake means opens and fluid flows through said exhaust fluid cooler and said intake means into said cylinder;

c) said power piston moves through its bottom dead center position and starts back up, while said plunger continues its downward exhaust and intake stroke;

d) said plunger reverses to an upward movement, said one way flow means opens, said exhaust means closes, said intake means closes, thereby ending said exhaust and intake stroke;

e) said power piston and said plunger move up toward said cylinder head, thereby performing a compression stroke whereby said fluid trapped in said cylinder is compressed;

f) at about 85% of the upward movement of said power piston, said plunger moves away from its position adjacent to said power piston and moves toward said cylinder head;

g) as said plunger moves up said compressed fluid moves through said regenerator and said heater and said fluid heats;

h) the space between said moving plunger and said power piston continues to be heated as said power piston moves away from said cylinder head in said power piston's expansion stroke;

i) after said plunger moves to the top of said cylinder adjacent to said cylinder head it remains there while said power piston continues its expansion stroke;

j) the cycle repeats.

13. An engine as recited in claim 11 that is operated with minimum cycle pressures greater than atmospheric.

* * * * *